United States Patent
Erickson et al.

(10) Patent No.: US 9,404,389 B2
(45) Date of Patent: Aug. 2, 2016

(54) PASSIVE COOLING SYSTEM FOR CONTROL VALVE ACTUATORS WITHIN A NEGATIVE PRESSURE TURBINE ENCLOSURE USING AMBIENT COOLING AIR

(71) Applicant: General Electric Company, Schenectady, NY (US)

(72) Inventors: Dean Matthew Erickson, Simpsonville, SC (US); Martin Lopez, Queretaro (MX); Jose Francisco Aguilar, Queretaro (MX)

(73) Assignee: General Electric Company, Schenectady, NY (US)

( * ) Notice: Subject to any disclaimer, the term of this patent is extended or adjusted under 35 U.S.C. 154(b) by 290 days.

(21) Appl. No.: 14/034,632

(22) Filed: Sep. 24, 2013

(65) Prior Publication Data

US 2015/0082767 A1    Mar. 26, 2015

(51) Int. Cl.

| | |
|---|---|
| *F02C 6/08* | (2006.01) |
| *F01D 25/12* | (2006.01) |
| *F02C 3/13* | (2006.01) |
| *F02C 7/18* | (2006.01) |
| *F02C 9/18* | (2006.01) |
| *F01D 11/24* | (2006.01) |

(52) U.S. Cl.
CPC ............... *F01D 25/12* (2013.01); *F01D 11/24* (2013.01); *F02C 3/13* (2013.01); *F02C 6/08* (2013.01); *F02C 7/18* (2013.01); *F02C 9/18* (2013.01)

(58) Field of Classification Search
CPC ................ F02C 6/08; F02C 7/18; F02C 3/13; F02C 9/18
USPC .................................. 137/334, 339; 60/39.83
See application file for complete search history.

(56) References Cited

U.S. PATENT DOCUMENTS

| | | | | |
|---|---|---|---|---|
| 3,587,766 | A * | 6/1971 | Slade ...................... | F02C 3/113 180/301 |
| 4,195,655 | A * | 4/1980 | Augsburger .......... | F16K 49/005 137/334 |
| 4,466,459 | A * | 8/1984 | Higgins ................. | F15B 21/02 137/624.11 |
| 5,487,407 | A * | 1/1996 | Eaker ....................... | F01N 3/22 137/522 |
| 5,791,744 | A | 8/1998 | Wood et al. | |
| 5,814,825 | A * | 9/1998 | Mussman ................. | G21F 3/00 250/506.1 |
| 6,178,956 | B1 * | 1/2001 | Steinmann ......... | F02M 25/0724 123/568.21 |

(Continued)

FOREIGN PATENT DOCUMENTS

| | | |
|---|---|---|
| EP | 0 083 833 | 7/1983 |
| EP | 0 855 319 A2 | 7/1998 |

(Continued)

*Primary Examiner* — William H Rodriguez
*Assistant Examiner* — Eric Linderman
(74) *Attorney, Agent, or Firm* — Sutherland Asbill & Brennan LLP

(57) ABSTRACT

The present application provides a passive control valve actuator cooling system to provide a flow of cooling air to a control valve actuator used with a gas turbine engine. The passive control valve actuator cooling system may include a turbine enclosure with a negative pressure therein, a radiation shield with a number of radiation shield outlets and the control valve actuator positioned therein, and a cooling air line extending from outside of the turbine enclosure to the radiation shield such that the negative pressure within the turbine enclosure pulls the flow of cooling air into and through the radiation shield so as to cool the control valve actuator.

15 Claims, 2 Drawing Sheets

(56) References Cited

U.S. PATENT DOCUMENTS

| | | | | |
|---|---|---|---|---|
| 6,186,515 | B1* | 2/2001 | Rohm | B23B 31/302 165/47 |
| 6,412,284 | B1* | 7/2002 | Horner | F01D 25/30 60/39.52 |
| 6,487,863 | B1* | 12/2002 | Chen | F02C 6/08 60/39.12 |
| 7,448,212 | B2* | 11/2008 | Wood | F02B 29/0475 60/598 |
| 7,520,574 | B2 | 4/2009 | Schweikert et al. | |
| 8,893,711 | B2* | 11/2014 | Kennedy | F24J 2/055 126/651 |
| 9,188,057 | B2* | 11/2015 | Matthews | F02B 37/186 |
| 2002/0023426 | A1* | 2/2002 | Schroeder | F01D 25/12 60/39.182 |
| 2002/0040575 | A1* | 4/2002 | Okano | F02C 6/18 60/39.511 |
| 2003/0046938 | A1* | 3/2003 | Mortzheim | F01D 17/105 60/782 |
| 2003/0136356 | A1* | 7/2003 | Namkung | F02C 3/055 123/27 R |
| 2003/0167750 | A1* | 9/2003 | Bornhoft | F02C 3/13 60/226.1 |
| 2003/0188700 | A1* | 10/2003 | Mitsuhashi | F02M 25/038 123/25 C |
| 2004/0130205 | A1 | 7/2004 | Wood et al. | |
| 2005/0082906 | A1 | 4/2005 | Wood et al. | |
| 2006/0096301 | A1* | 5/2006 | Triebe | F25D 19/006 62/6 |
| 2009/0104020 | A1* | 4/2009 | Roush | F02C 6/08 415/145 |
| 2009/0140182 | A1* | 6/2009 | Agrawal | B64C 27/22 251/5 |
| 2010/0000219 | A1* | 1/2010 | Snook | F02C 6/08 60/770 |
| 2013/0164115 | A1* | 6/2013 | Sennoun | F02C 7/185 415/1 |
| 2013/0230412 | A1* | 9/2013 | Alamaki | F02C 6/06 417/53 |
| 2013/0247584 | A1* | 9/2013 | Kasibhotla | F01D 25/12 60/782 |
| 2014/0047835 | A1* | 2/2014 | Matthews | F02B 33/00 60/602 |
| 2015/0086338 | A1* | 3/2015 | Aguilar | F01D 25/12 415/144 |
| 2015/0132101 | A1* | 5/2015 | Marsh | F01D 25/12 415/1 |

FOREIGN PATENT DOCUMENTS

| | | |
|---|---|---|
| EP | 1 437 281 A | 7/2004 |
| GB | 754 153 A | 8/1956 |
| WO | 2007/126579 A1 | 8/2007 |

* cited by examiner

PASSIVE COOLING SYSTEM FOR CONTROL VALVE ACTUATORS WITHIN A NEGATIVE PRESSURE TURBINE ENCLOSURE USING AMBIENT COOLING AIR

TECHNICAL FIELD

The present application and the resultant patent relate generally to gas turbine engines and more particularly relate to a passive cooling system for cooling control valve actuators and the like with a flow of ambient cooling air instead of forced cooling.

BACKGROUND OF THE INVENTION

In gas turbine engines, a portion of the total airflow from the compressor may be diverted to cool various turbine components. Specifically, a flow of bleed air may be extracted from a stage of the compressor to cool a stage of the turbine or other components. This diverted airflow, however, may consume a significant portion of the total airflow through the compressor. The management and control of these parasitic airflows thus may increase the overall efficiency and performance of the gas turbine engine.

The airflow extractions from the compressor may be controlled by one or more control valves positioned on the air extraction lines. The actuators for these control valves and other types of control valves may be mounted within the high temperature environment of a gas turbine enclosure. Given this environment, the control valve actuators may be positioned within a radiation shield and the like so as to mitigate the impact of the high temperatures. These radiation shields, however, may not properly protect the control valve actuators from convective heating that may be present within the enclosure. Forced air cooling from a blower or an air compressor may assist in cooling the control valve actuators. These cooling systems, however, also may be a parasitic drain on the overall operation of the gas turbine engine.

There is thus a need for an improved control valve actuator cooling system. Preferable such an improved cooling system may provide cooling to the control valve actuators without the use of complex components or parasitic airflows so as to provide increased reliability and efficiency with decreased overall costs.

SUMMARY OF THE INVENTION

The present application and the resultant patent thus provide a passive control valve actuator cooling system so as to provide a flow of cooling air to a control valve actuator used with a gas turbine engine. The passive control valve actuator cooling system may include a turbine enclosure with a negative pressure therein, a radiation shield with a number of radiation shield outlets and with the control valve actuator positioned therein, and a cooling air line extending from outside of the turbine enclosure to the radiation shield such that the negative pressure within the turbine enclosure pulls the flow of cooling air into and through the radiation shield so as to cool the control valve actuator.

The present application and the resultant patent further provide a method of cooling a control valve actuator used with a control valve in a gas turbine engine. The method may include the steps of positioning the control valve actuator within a radiation shield, positioning the control valve actuator and the radiation shield within a turbine enclosure, providing a cooling air line from outside of the turbine enclosure to the radiation shield, creating a negative pressure in the turbine enclosure, and drawing a flow of ambient cooling air through the cooling air line and through the radiation shield so as to cool the control valve actuator.

The present application and the resultant patent thus provide a gas turbine engine. The gas turbine engine may include a compressor, a turbine, and an air extraction system extending from the compressor to the turbine with a control valve actuator positioned about the turbine, and a passive control valve actuator cooling system for providing a flow of cooling air to the control valve actuator.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
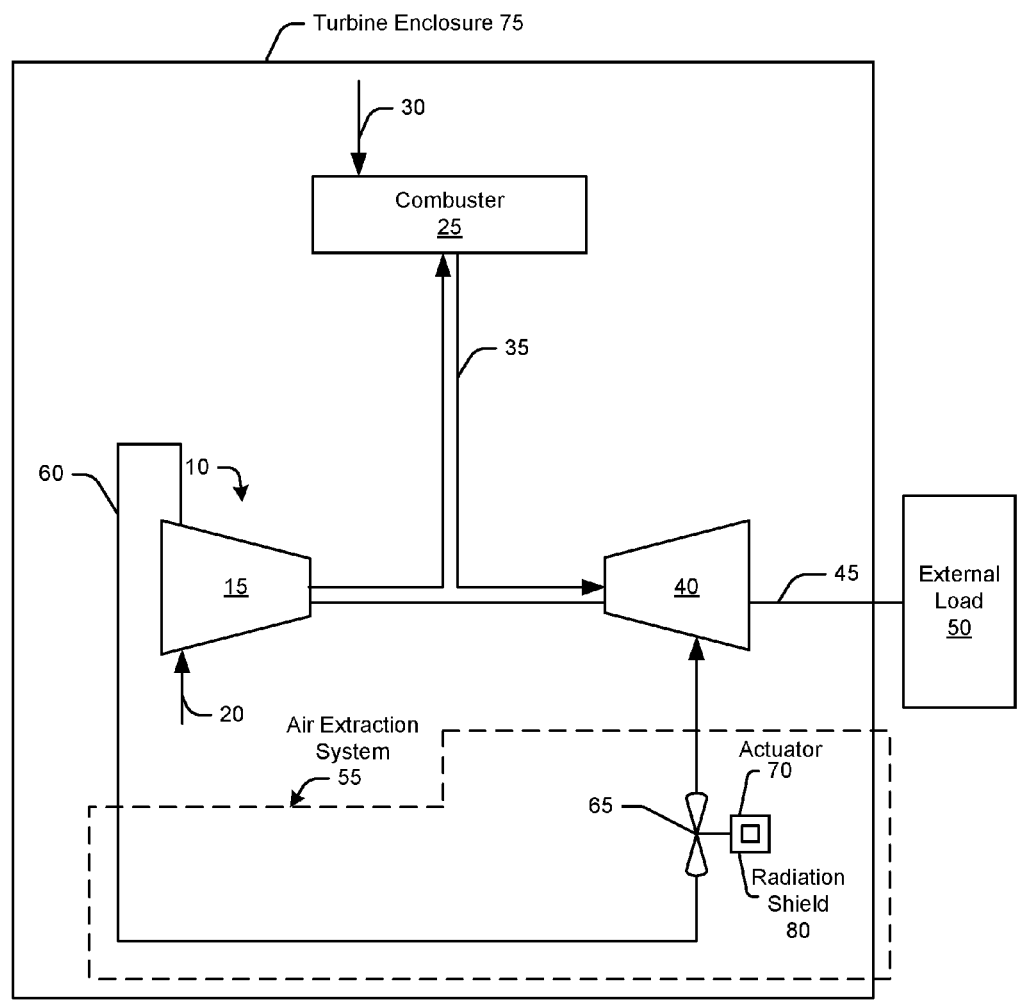
FIG. 1 is a schematic diagram of a gas turbine engine showing a compressor, a combustor, a turbine, a load, and an air extraction line.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and/or blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

The gas turbine engine 10 also may include an air extraction system 55. As described above, one or more extractions of high pressure air may be taken from the compressor 15 or elsewhere and delivered to the turbine 40 or another type of component for cooling purposes. The air extraction system 55 may include a number of air extraction lines 60. Although only a single air extraction line 60 is shown, the air extraction system 55 may have any number of air extraction lines 60 as well as related bypass lines, ejectors, and other components. The air extraction line 60 may have one or more control valves 65 positioned thereon. Each control valve 65 may be operated by an actuator 70 and the like. The control valve actuator 70 may include a solenoid and the like for largely on-off operation. Other types of control valve actuators may be used. Likewise, other types of control valves 65 may be used.

The control valves 65 and the actuators 70 may be positioned within a turbine enclosure 75. The turbine enclosure 75 is generally considered to be a high temperature environment. As a result, the control valve actuators 70 may be positioned within a radiation shield 80 and the like as described above. Other types of heat mitigation devices also may be known. The radiation shields 80 and the like, however, may not sufficiently protect the control valve actuators 70 from the convective heating that may be present in the turbine enclosure 75. The air extraction system 55 described herein is for the purpose of example only. Many other types of air extraction systems and components may be known.

Figure 2:
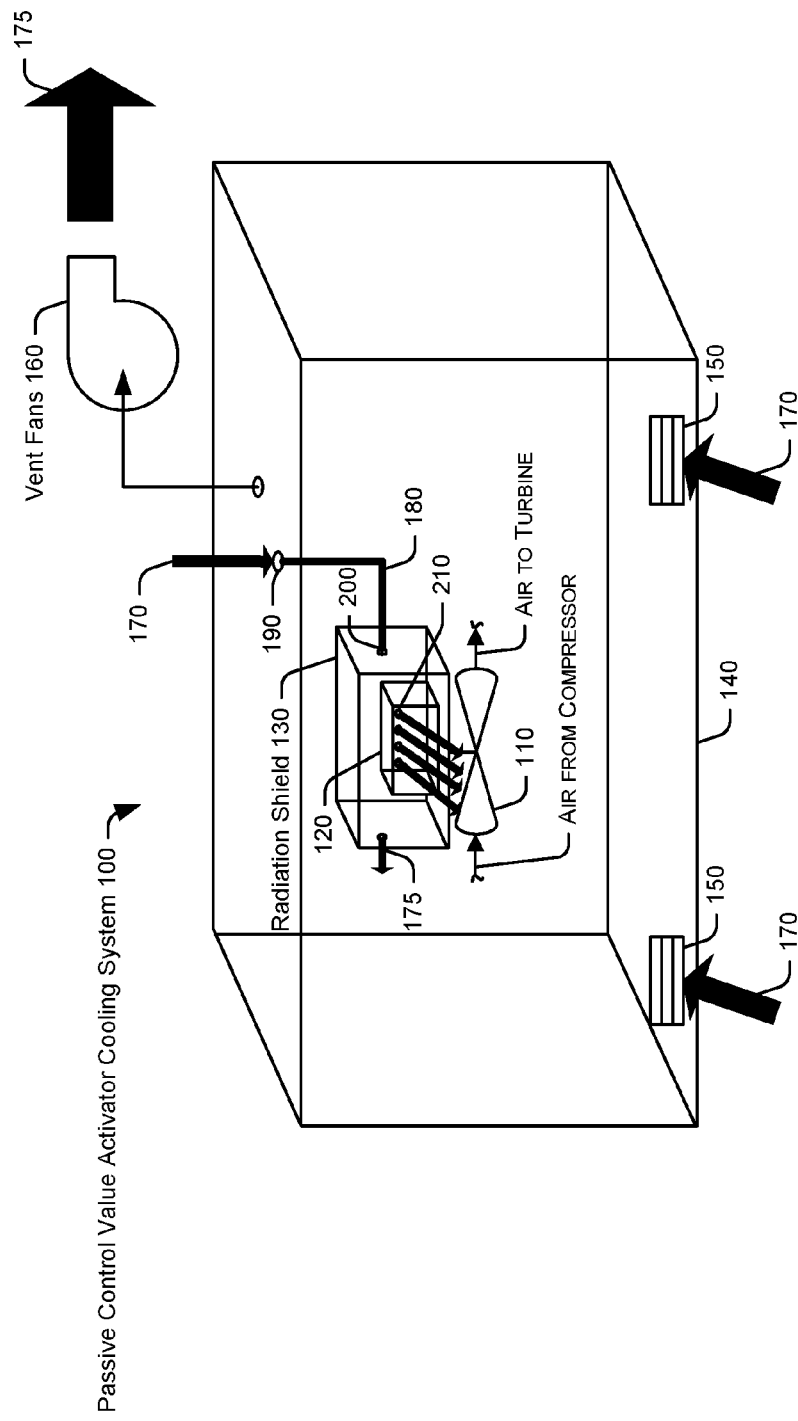
FIG. 2 is a schematic diagram of a passive control valve actuator cooling system as may be described herein.

FIG. 2 shows an example of a passive control valve actuator cooling system 100 as may be described herein. The control valve actuator cooling system 100 may be used with a control valve 110 of the gas turbine engine 10 and the like. The control valve 110 may be used with the air extraction system 55 so as to provide a flow of cooling air to the turbine 40 or with any other type of turbine flow system. The control valve 110 may have any size, shape, or configuration. Similar to those described above, the control valve 110 may be operated by an actuator 120. The control valve actuator 120 may include a solenoid and the like for largely on-off operation. The control valve actuator 120 may have any size, shape, or configuration. Other types of control valve actuators and other types of control devices may be used herein. Any number of the control valve actuators 120 or other types of devices may be used herein. Other components and other configurations may be used herein.

In order to allow the control valve actuator 120 to operate in the high temperature environment, the control valve actuator 120 may be positioned within a radiation shield 130. The radiation shield 130 may be largely of conventional design and may have any size, shape, or configuration. The passive control valve actuator cooling system 100 may be used with a negative pressure turbine enclosure 140. The negative pressure turbine enclosure may have any size, shape, or configuration. The negative pressure turbine enclosure 140 may include a number of enclosure inlets 150 and one or more vent fans 160. The enclosure inlets 150 and the vent fans 160 may be of conventional design and may have any size, shape, or configuration. The vent fan 160 may create a negative pressure within the turbine enclosure so as to pull a flow of ambient cooling air 170 into the turbine enclosure via the enclosure inlets 150 and cool the components therein.

The passive control valve actuator cooling system 100 also may include a cooling air line 180. The cooling air line 180 may have any size, shape, or configuration. The cooling air line 180 may extend from an air line inlet 190 on the negative pressure turbine enclosure 140 to a radiation shield inlet 200 positioned on the radiation shield 130 about the control valve actuator 120. The radiation shield 130 also may have a number of outlets 210 thereon. Any number of the radiation shield outlets 210 may be used in any size, shape, or configuration. Any number of cooling air lines 180 may be used herein with any number of radiation shields 130. Other components and other configurations also may be used herein.

In use, the negative pressure within the turbine enclosure 140 draws a flow of ambient cooling air 170 into the cooling air line 180 of the control valve actuator cooling system 100 via the air line inlet port 190. The ambient cooling air 170 travels into the radiation shield 130 via the radiation shield inlet 200 so as to cool the control valve actuator 120. The now heated air flow 175 then may exit via the radiation shield outlets 210 and eventually may be vented from the negative pressure turbine enclosure 140 via the vent fan 160. Any number of the passive control valve actuator systems 100 may be used herein. The passive control valve actuator system 100 may be used with other types of conventional cooling systems.

The passive control valve actuator cooling system 100 thus provides a passive system for cooling the control valve actuators 120 within the negative pressure turbine enclosure 140 with the flow of ambient cooling air 170. The negative pressure within the turbine enclosure 140 provides the motive force to pull the flow of ambient cooling air 170 therethrough. The flow of ambient cooling air 170 combines with the radiation shield 130 to maintain the control valve actuators 120 at a reduced temperature. Specifically, the passive control valve actuator cooling system 100 adequately cools the control valve actuators 120 therein without the use of expensive parasitic airflows. The passive control valve actuator cooling system 100 thus may provide increased component lifetime and reliability in a low cost and efficient manner.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A passive control valve actuator cooling system to provide a flow of ambient cooling air to a control valve actuator used with a gas turbine engine, comprising:
    a turbine enclosure;
    the turbine enclosure comprising a negative pressure therein;
    a radiation shield with the control valve actuator positioned therein, wherein the radiation shield is disposed within the turbine enclosure and forms a boundary about the control valve actuator;
    the radiation shield comprising a plurality of radiation shield outlets; and
    a cooling air line extending from outside of the turbine enclosure to the radiation shield such that the negative pressure within the turbine enclosure pulls the flow of ambient cooling air into and through the radiation shield and around the control valve actuator so as to cool the control valve actuator.

2. The passive control valve actuator cooling system of claim 1, wherein the turbine enclosure comprises an air line inlet in communication with the cooling air line.

3. The passive control valve actuator cooling system of claim 1, wherein the radiation shield comprises a radiation shield inlet in communication with the cooling air line.

4. The passive control valve actuator cooling system of claim 1, wherein the turbine enclosure comprises one or more enclosure inlets in communication with one or more flows of ambient cooling air.

5. The passive control valve actuator cooling system of claim 1, wherein the turbine enclosure comprises one or more vent fans to pull the flow of ambient cooling air into the turbine enclosure and flow of a heated air out of the turbine enclosure.

6. The passive control valve actuator cooling system of claim 1, wherein the control valve actuator is in communication with a control valve.

7. The passive control valve actuator cooling system of claim 6, wherein the control valve is in communication with an air extraction line.

8. The passive control valve actuator cooling system of claim 1, further comprising a plurality of cooling air lines positioned on the turbine enclosure and in communication with a plurality of control valve actuators.

9. The passive control valve actuator cooling system of claim 1, wherein the cooling air line is in communication with a plurality of radiation shields and/or a plurality of control valve actuators.

10. The passive control valve actuator cooling system of claim 1, wherein the control valve actuator comprises a solenoid.

11. A method of cooling a control valve actuator used with a control valve in a gas turbine engine, comprising:
 positioning the control valve actuator within a radiation shield, wherein the radiation shield forms a boundary about the control valve actuator;
 positioning the control valve actuator and the radiation shield within a turbine enclosure;
 providing a cooling air line from outside of the turbine enclosure to the radiation shield;
 creating a negative pressure in the turbine enclosure; and
 drawing a flow of ambient cooling air through the cooling air line and through the radiation shield and around the control valve actuator so as to cool the control valve actuator.

12. The method of claim 11, wherein the step of creating a negative pressure in the turbine enclosure comprises operating a vent fan on the turbine enclosure.

13. The method of claim 11, wherein the step of drawing a flow of ambient cooling air through the radiation shied comprises positioning a plurality of radiation shield outlets thereon.

14. A gas turbine engine, comprising:
 a compressor;
 a turbine; and
 an air extraction system extending from the compressor to the turbine;
 the air extraction system comprising a control valve actuator positioned about the turbine; and
 a passive control valve actuator cooling system for providing a flow of ambient cooling air to the control valve actuator, wherein the passive control valve actuator cooling system comprises:
 a radiation shield with the control valve actuator therein, wherein the radiation shield forms a boundary about the control valve actuator;
 a turbine enclosure with the control valve actuator therein, wherein the turbine enclosure comprises a negative pressure therein; and
 a cooling air line extending from outside of the turbine enclosure to the radiation shield such that the negative pressure within the turbine enclosure pulls the flow of ambient cooling air into and through the radiation shield and around the control valve actuator so as to cool the control valve actuator.

15. The gas turbine engine of claim 14, wherein the turbine enclosure comprises one or more inlets and a vent fan.

* * * * *